(12) United States Patent
Blochmann et al.

(10) Patent No.: US 8,939,746 B2
(45) Date of Patent: Jan. 27, 2015

(54) QUICK-CHANGE SYSTEM AND OPERATING METHOD FOR A CONTAINER PROCESSING MACHINE

(75) Inventors: Erik Blochmann, Neutraubling (DE); Bernhard Sternkopf, Burglengenfeld (DE)

(73) Assignee: Krones AG, Neutraubling (DE)

( * ) Notice: Subject to any disclaimer, the term of this patent is extended or adjusted under 35 U.S.C. 154(b) by 417 days.

(21) Appl. No.: 13/328,205

(22) Filed: Dec. 16, 2011

(65) Prior Publication Data

US 2012/0153524 A1    Jun. 21, 2012

(30) Foreign Application Priority Data

Dec. 16, 2010 (DE) .......................... 10 2010 063 243

(51) Int. Cl.
*B29C 49/42* (2006.01)
*B29C 49/48* (2006.01)
*B29C 49/78* (2006.01)
(Continued)

(52) U.S. Cl.
CPC ................ *B29C 49/42* (2013.01); *B29C 49/48* (2013.01); *B29C 49/78* (2013.01); *B29C 2049/1204* (2013.01); *B29C 2049/4856* (2013.01); *B29C 2049/5893* (2013.01); *B29C 49/68* (2013.01)
USPC ... 425/135; 29/714; 198/867.11; 198/867.15; 425/169; 425/182; 425/534

(58) Field of Classification Search
CPC .............. B29C 2049/4205; B29C 2049/4856; B29C 49/42; B29C 49/48; B29C 49/68; B29C 49/78
USPC .......................... 425/135, 169, 182, 526, 534; 198/867.01, 867.11, 867.14, 867.15; 29/714
See application file for complete search history.

(56) References Cited

U.S. PATENT DOCUMENTS 8,047,830 B2 * 11/2011 Kiefl .............................. 425/182
8,235,698 B2 * 8/2012 Schonberger et al. ........ 425/182
(Continued)

FOREIGN PATENT DOCUMENTS

CN         2834875 Y     11/2006
CN       200960722 Y     10/2007
(Continued)

OTHER PUBLICATIONS

Notification of the Second Office Action, The State Intellectual Property Office of the People's Republic of China, Application No. 201110431733.7 dated Mar. 21, 2014.
(Continued)

*Primary Examiner* — Robert B Davis
(74) *Attorney, Agent, or Firm* — Marshall, Gerstein & Borun LLP (57) ABSTRACT

In a quick-change system for exchangeable machine elements, particularly in a container processing machine in which the machine element (E) can be brought into a target position and can be localized in a target position by a securing unit comprising at least one securing element, at least a second securing unit (P2) is provided with which a machine element that either has not been brought into the target position or that has moved out of the target position (X) can be localized in a securing position. The securing position is detected and evaluated as grounds for a corrective action before commencing an operation or during the operating sequence before a corrective action is initiated and executed.

21 Claims, 4 Drawing Sheets

(51) Int. Cl.
  *B29C 49/12* (2006.01)
  *B29C 49/58* (2006.01)
  *B29C 49/68* (2006.01)

(56) References Cited

U.S. PATENT DOCUMENTS

| | | |
|---|---|---|
| 2002/0036027 A1 | 3/2002 | Kondo et al. |
| 2009/0044491 A1 | 2/2009 | De Pietra et al. |
| 2011/0120840 A1 | 5/2011 | Schonberger |

FOREIGN PATENT DOCUMENTS

| | | |
|---|---|---|
| CN | 101722674 A | 6/2010 |
| DE | 6922331 U | 11/1969 |
| DE | 19803820 A1 | 8/1999 |
| DE | 102007037400 A1 | 2/2009 |
| DE | 102008033549 A1 | 2/2009 |
| EP | 2030759 A1 | 3/2009 |
| WO | WO-2009103435 A1 | 8/2009 |

OTHER PUBLICATIONS

German Search Report for 10 2010 063 243.0 dated Jun. 7, 2011.
Chinese Notification of the First Office Action for Application No. 201110431733.7 dated Nov. 6, 2013.
Notification of the Third Office Action for Application No. 201110431733.7, The State Intellectual Property Office of the People's Republic of China, dated Sep. 29, 2014.

* cited by examiner

QUICK-CHANGE SYSTEM AND OPERATING METHOD FOR A CONTAINER PROCESSING MACHINE

CROSS-REFERENCE TO RELATED APPLICATION

The present application claims the benefit of priority of German Application No. 102010063243.0, filed Dec. 16, 2010. The entire text of the priority application is incorporated herein by reference in its entirety.

FIELD OF THE DISCLOSURE

The disclosure relates to a quick-change system and to an operating method for a container processing machine.

BACKGROUND

During the operating sequence, machines that process or handle a product often have machine elements that have to be exchanged depending on the product when the product is changed. Change systems are known for this, e.g., in container processing machines, whereby in these change systems an operator or a servo-device operates the machine element and screws, twist grips or similar attachment elements in such a way that the machine element is localized at the target position in an unambiguous, controlled manner after the exchange. This is time-consuming, however, and arduous for the operator, particularly in machines that contain a multiplicity of machine elements that have to be exchanged. In order to minimise the exchange times, quick-change systems have therefore become known in which the machine element is localized in the target position, e.g., via an energy accumulator by means of a spring force, i.e., the quick-change system automatically sets up the target position.

Such quick-change systems have become the standard in the widest range of machines and, without restriction, particularly in container processing machines, such as, for example, container blow-molding machines, and there especially for localization of exchangeable fitting parts, molding shells, molding bottoms and the like, whereby in these cases cited only by way of example, the target position is snapped into place, coupled, latched or adjusted in a similar manner, for example, assisted by springs.

In the quick-change system known from EP 2 030 759A, for example, a shielding plate, as a fitting part on a holder of a preform product conveyor chain in a heating module, is localized at the target position with a plug-in foot in a bore hole of the holder by means of a pin-shaped securing element being brought by means of a spring force into an engagement position in which a latching element of the securing element acts in combination with a latch depression of the plug-in foot. For the exchange, the securing element is relocated relative to the plug-in foot by means of an external application of force, e.g. linearly, into a release position before the plug-in foot is pulled out and the plug-in foot of a new fitting part is inserted. The securing element, under the spring force, returns to the engagement position and consequently localises the plug-in foot, and consequently the fitting part, at the target position. This quick-change system allows short exchange times, but holds the danger that the operator or an exchange machine has no influence on it or does not receive any feedback indicating either that the machine element has been properly brought to the target position and is localized there and/or that the securing element, under a spring force, has taken on the locking position. If the machine element is not brought into the target position and/or if the securing element is not properly placed into the locking position, then the machine element can loosen from the holder in an uncontrolled manner during the machine's operating sequence, for example, due to vibrations caused by operation, and either cause damage or prevent proper product processing. In a heating module of a container blow-molding machine, a fitting part that loosens can, for example, damage heating devices or cause incorrect heating of a preform product, from which a fault container is then blow-molded. The fitting part can even fall out. The same applies to molding shells or bottom molds of blow molds with a similar quick-change system.

In a packaging processing machine known from WO 2009/103435 A, format-dependent function elements are exchanged when there is a format change and these function elements are positioned at positions along the processing path that have been provided with identifications. Only during the machine's conversion phase does a computer then carry out a comparison of the target and actual positions of the exchanged function elements, and at least the detected deviations are indicated and, for example, corrected by an operator. If a deviation between the target position and the actual position arises after the operating sequence commences, however, this is no longer detected, so that damage can occur.

Similarly, in a container folding machine known from DE 198 03 820 A, each machine element that depends on the pre-cut part is exchanged when there is a change in the pre-cut part and manually brought into the target position. The actual position is measured with measuring devices when there is an exchange. The target position is stored, so that a computer-assisted comparison can be made in order to ensure correct positioning or in order to derive information for the position correction during the machine's exchange phase. However, if deviations between the target position and the actual position arise later in the operating sequence, it is no longer possible to exclude damage reliably.

SUMMARY OF THE DISCLOSURE

The basis of the disclosure is formed by one aspect of improving a quick-change system of the type mentioned at the beginning to the effect that the danger of damage due to machine elements that are incorrectly positioned after an exchange is also minimized during the machine's operating sequence, and by an operating method for a container processing machine that guarantees a high level of operational reliability in spite of the system-related disadvantages of the quick-change system.

In spite of the quick-change system that allows short exchange times, the second securing unit guarantees that, e.g., in the event of an uncontrolled loosening of the machine element during the operating sequence, the machine element does not completely detach from the holder in an uncontrolled manner or move so far that it causes damage during the operating sequence. The second securing unit is executed and positioned in such a way that a machine element that initially loosens in an uncontrolled manner is immediately brought back under control and localized in the securing position and can no longer loosen further. It remains positioned in the securing position in such a way that no damage or no significant damage can result in the machine. Initially the second securing unit ensures that a loosened machine element at least does not initially reduce the operational reliability.

According to the method, the second securing unit is used in order to allow a defined detection of a loosened machine element and, upon detection of the securing position, to evaluate it for initiating or requesting a corrective action. The second securing unit and the securing position for the machine element that this securing unit sets up can namely represent a danger for the operating sequence, because proper product processing can only be reliably guaranteed in the target position, and damage would accordingly be caused in the event of an operating sequence that lasted a longer time. Countermeasures can be taken for this, however. Detection is simple and can be carried out with simple detection means, because only the securing position needs to be considered, and it is not necessary to scan each uncontrolled change in the machine element's position. The second securing unit is provided, so to speak, combinatorially in the quick-change system for safety reasons, in order, in the event of a fault, to prevent the machine element from becoming completely detached from the holder or from protruding too far out of the holder, and this second securing unit is used according to the method as a precondition for simple and reliable detection and possibly for remedying a fault that increases the operational hazard. This is particularly expedient in the heating module of a container blow-molding machine, for example, for fitting parts on a conveyor chain for transporting the preforms through the heating module, because fitting parts that have become completely detached or that project too far could permanently damage heating devices, and above all the proper processing of the preforms in the heating module could no longer be guaranteed, instead leading to an expensive rejection rate. However this operating method is also expedient, for example, for molding shells or mold bottoms of blow molds in the blow-molding machine that can be exchanged with a fast-change system in short exchange times.

In an expedient embodiment of the quick-change system, the target position and the securing position are each mechanically locked positions of the machine element in the holder, preferably in the target position by means of an interlocking engagement of the machine element and the securing element and in the securing position by means of an interlocking engagement of the machine element and either the same or an additional securing element. In particular, the securing position prevents the machine element from being able to move in an uncontrolled manner beyond the securing position into a dangerous position or from being able to detach completely from the holder, for instance, in the face of vibrations caused during operation or forces exercised thereupon during the operating sequence. In the case of a second spring-loaded securing element for the securing position, the securing position itself could then be set up for averting damage should the spring of the first securing element be broken or should the function of the same become defective.

In a further expedient embodiment, the respective securing element is arranged in the holder in such a manner that it is movable into a locking position on the machine element by means of a spring force, and can be rapidly brought from the locking position into a release position by means of an external application of force. The external application of force can be applied by an operator, for example, manually, or by machine, by means of a changer or exchange machine. On the other hand, the locking position is set by the spring force after the external application of force has stopped.

In a particularly expedient embodiment of the quick-change system, the securing position of the machine element in the holder is detected by a monitoring device and, if it is detected after an exchange, it is evaluated as grounds for a corrective action before commencing operation or during the operating sequence of the machine. The detection of the securing position can, e.g., be carried out over at least one cycle or a plurality of cycles of the machine, in order first to determine the gradually occurring loosening of the machine element reliably and also to exclude or minimise the subsequent damage for the processing product.

In an expedient embodiment, the quick-change system is used for a machine element that is a molding shell or bottom mold of a preform blow mold or a fitting part, such as a shielding plate or a heating mandrel of a preform conveyor chain in a heating module, in each case in a container blow-molding machine.

In a more concrete embodiment, the fitting part on the holder of the preform conveyor chain is localized in the target position and the securing position is localized with at least one plug-in foot in one of the holder's bore holes that defines the exchange direction. The respective securing element crosses the bore hole in the holder and is acted upon by at least one spring in the engagement direction for engaging with the plug-in foot. The securing position is thereby arranged at a predetermined distance in the exchange direction from the target position, said distance excluding a hazard, namely on the side of the target position from which the plug-in foot moves to the target position during an exchange. Should the plug-in foot not have been properly brought to the target position, or should the securing element not have been properly latched in place and not have properly set up the target position, the plug-in foot, which initially loosens in an uncontrolled manner, is immediately caught and set up in the predetermined securing position, on the one hand, in order to minimize or exclude a hazard, and on the other hand, in order to make it possible to detect the securing position unambiguously and simply.

The securing element can thereby have a latching element and the plug-in foot at least two axially spaced latching depressions that define the target position and the securing position for engaging with the respective latching element.

This structure can also be brought about in the opposite manner by means of having the securing element a latching depression and the plug-in foot having at least two axially spaced latching elements that define the target position and the securing position for engaging with the respective latching depression.

A first latching depression of the plug-in foot, which is an axially wider notch or a first circumferential grove, is constructionally simple and functionally reliable and the second latching depression is an axially narrower notch or a second circumferential groove in the plug-in foot. The latching element is at least one nose that projects inwardly into a recess that encompasses the plug-in foot with leeway, whereby the width of this nose corresponds, for example, to the axial width of the second latching depression. The second latching depression can otherwise have a smaller depth than the first latching depression.

The monitoring device for detecting the securing position can have at least one detector positioned separately from the holder so as to be stationary. Thanks to the stationary positioning of the detector, simple power supply or signal transmission is guaranteed, while the holder with the machine element moves past the detector during the operating sequence. Preferably, the detector can detect an overlap of the machine element in the securing position or of a prominent part of the machine element over the holder or relative to other endangered components in the machine.

At least one opto-electric, inductive or magnetic or mechanical detector is expediently provided for this and connected to a machine controller.

A remote controlled, for example, pneumatic, corrective drive is expediently provided, preferably in an easily accessible service area of the machine, e.g. on the preform conveyor chain, for readjustment of the machine element from the securing position back into the target position. After detection of the securing position, the machine element is, for example, set in a programmed routine in the service area and readjusted, before the operating sequence is started or continued. The corrective drive could also be an exchange machine that is provided for its part for exchanging many machine elements.

According to the method, it can be expedient if there are many exchangeable machine elements in the machine if, when a securing position is detected, the address of the machine element in question is identified within the machine and preferably indicated. Then an operator can intervene, or the error can be more simply remedied automatically.

Furthermore, it is expedient if, as a corrective action, the machine element is readjusted from the securing position back into the target position or again properly exchanged, and/or no product is assigned to it or a product already assigned to it is sorted out. This is expedient especially in the case of a preform product that would no longer be properly processed in the securing position of the machine element or fitting part. Alternatively or additionally, the machine can also be completely brought to a standstill.

For carrying out the corrective action, the machine element detected in the securing position is expediently transported into a predetermined, easily accessible service area of the machine for readjustment or for a further exchange. The corrective action is initiated and carried out manually or automatically there.

BRIEF DESCRIPTION OF THE DRAWINGS

Embodiments of the disclosure are explained using the drawings. Shown are.

DETAILED DESCRIPTION OF THE PREFERRED EMBODIMENT

Figure 1:
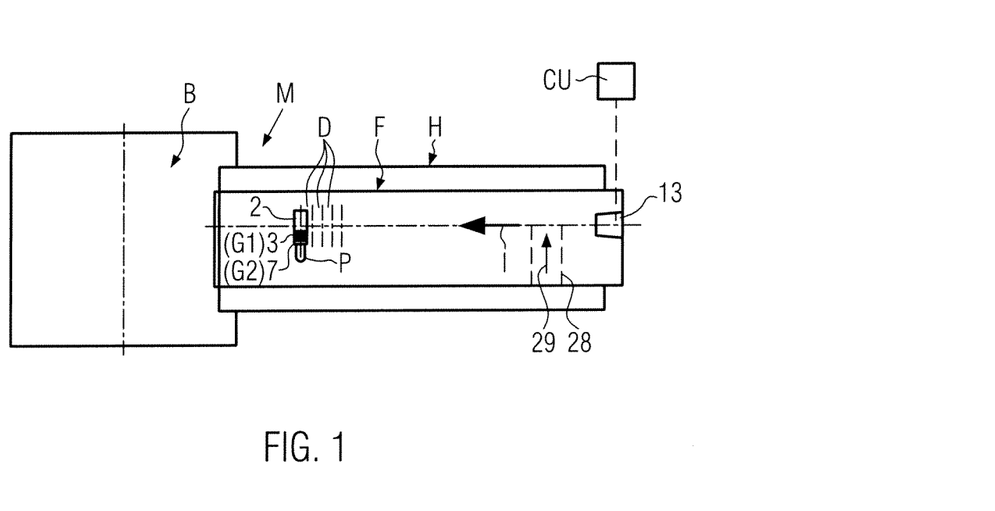
FIG. 1 a schematic representation of a machine equipped with holders and quick-change systems for machine elements, whereby a container blow-molding machine is illustrated as a non-restrictive example of a machine arranged for the concept according to the disclosure, FIG. 2 a side-view of a holder fitted with a positioned machine element, FIG. 3 a perspective view of a holder with machine element positioned thereupon, whereby a fitting part, as a non-restrictive example of a machine element, is shown as a shielding plate on a preform conveyor chain, FIG. 4 a sectional representation of the holder and a portion of the machine element localized therein in a target position, and FIG. 5 a sectional view corresponding to FIG. 4 with the machine element positioned in a securing position that differs from the target position of FIG. 4.

FIG. 1 schematically illustrates, as a non-restrictive example, a blow-molding machine M for containers, for example, a stretch blow-molding machine for plastic bottles. A blow-molding station B with a star wheel, not shown, for holding blow molds with molding shells and/or bottom molds, not shown, for example positioned by means of quick-change systems, not shown, is connected to a conveyor path F that runs for the most part in areas through a heating module H for preforms P to be heated and/or thermally processed by means of irradiation or in some other manner from the outside by means of heating devices. The conveyor direction of the conveyor path F is indicated by an arrow 1. The conveyor path F contains a multiplicity of mandrel devices D placed closely next to one another on a conveyor chain, each with a holder 2 mounted here in a suspended manner and at least one fitting part G1 (e.g., a preform heating mandrel 3) positioned thereupon in an exchangeable manner and a fitting part G2 (for example, of a shielding plate 7) positioned in an exchangeable manner. In the heating module H or in, for example, a section of the conveyor path F (not shown) that lies outside the heating module, an easily accessible service area 28 is provided in which, for example, an operator can intervene in the direction of the arrow 29, in order to correct an incorrect positioning of the fitting part G2, or a corrective mechanism 29, e.g., a pneumatic mechanism (optionally a change machine) is placed in the service area 28 that carries out the readjustment or a further exchange of an incorrectly positioned fitting part G2 automatically and/or under operator control.

An outlet 4 (FIG. 2) of the preform P is inserted on to the heating mandrel 3. The heating mandrels 3 are optionally rotated around their axles during the operating sequence of the machine M and thermally processed, whereby the outlet is protected by the shielding plate 7.

The outlet 4 of the preform P has (FIG. 2), for example, a support ring 5 lying on the outside and an external screw thread 6. Especially this outlet area must be shielded during the thermal processing of the preform P, because it already has the later form as in the blow-molded container and could suffer damage as the result of excessively intense thermal processing. The exchangeable fitting part G2 in the form of the shielding plate 7 is used for this purpose, whereby this shielding plate is positioned in the holder 2 with one or, as shown, two plug-in feet 9, 9' (FIG. 3) as an exchangeable machine element E. The shielding plate 7 shields the sensitive outlet area of the preform P in an inner bore hole 8.

Figure 2:
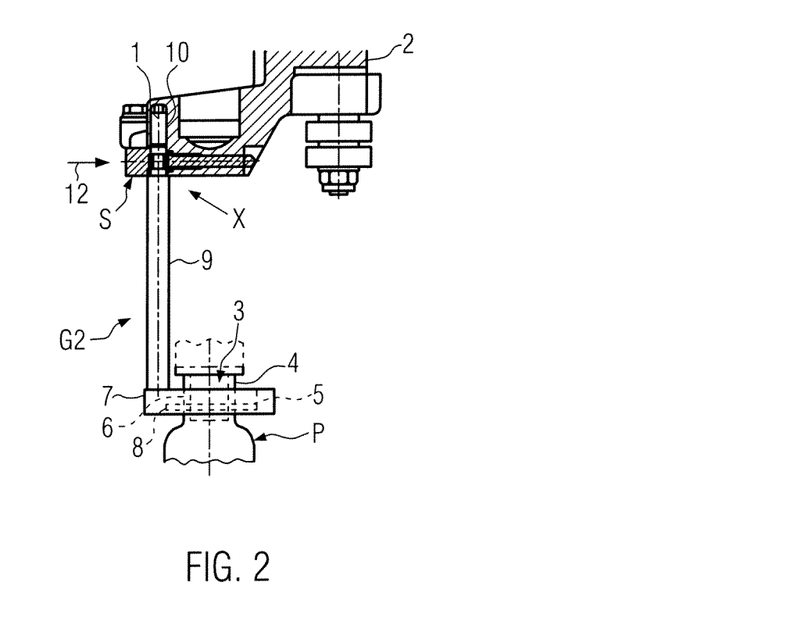

According to FIG. 2, a plug-in foot 9 is inserted into a bore hole 10 of the holder 2 with an end section 11 and positioned therein in a target position X by means of the quick-change system using a securing element S. The fitting part G2 that is localized by means of the securing element S can consequently no longer loosen from the holder 2 in an uncontrolled manner, assuming that it is positioned in the target position X indicated in FIG. 2, in which the proper processing of an attached preform P in the heating module H is ensured. In order to make it possible to exchange the fitting part G2 of the holder 2, an external application of force (arrow 12) must be applied to the securing element S in order to move this from the shown engagement position against a spring force and into a release position, which is not shown. Then the fitting part G2 can be pulled out of the bore hole 10 and replaced with another fitting part G2, which, for example, is needed for another preform size or the like, whereby the plug-in foot 9 of this other fitting part G2 is inserted into the bore hole 10 and then automatically secured by the securing element S in the target position X, assuming the plug-in foot 9 was slid in far enough and the securing element S was brought into proper engagement by means of the spring force. The exchanged fitting part G2 differs from the previously used fitting part G2, for example, by having a different size and/or arrangement of the shielding plate 7 and its inner bore hole 8, while its end section 11 is suitable for the bore hole 10 and the securing element S.

Figure 3:
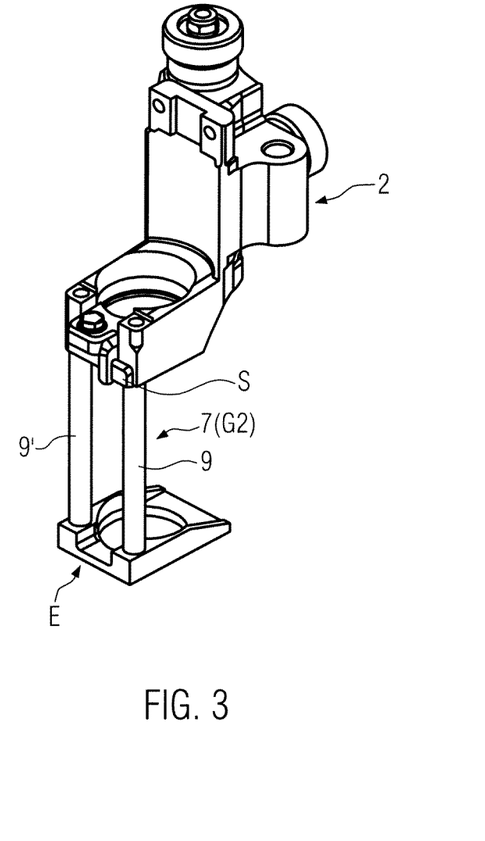

FIG. 3 shows the fitting part G2, in the form of the shielding plate 7, mounted on the holder 2 as a machine element of, for example, the machine shown in FIG. 1, whereby the machine element can be exchanged by activation of the securing element S.

Figure 4:
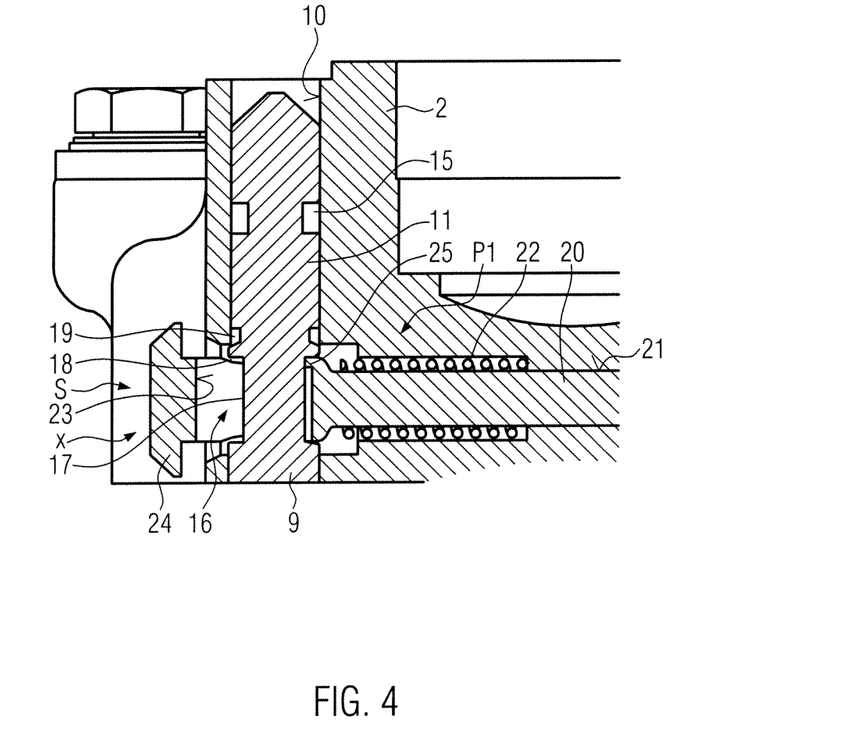
Figure 5:
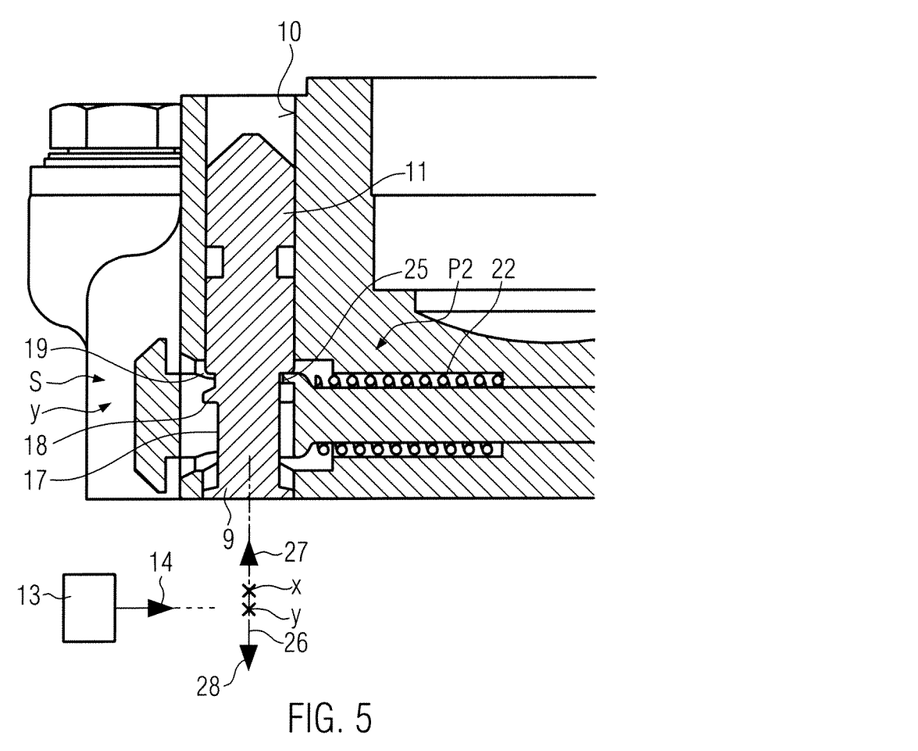

The sectional representations in FIGS. 4 and 5 show one possible embodiment of the quick-change system, comprising the plug-in foot 9 with the correspondingly shaped end section 11 and the securing element S, for, for example, the shielding plate 7 as the machine element E, namely in the target position X in FIG. 4 and, in FIG. 5, in a securing position Y that differs from the target position X.

The end section 11 of the plug-in foot is formed in a cone-shape and contains a circumferential groove 15, in which, for example, an O-ring or a slide ring seal, not shown, can be placed. For positioning the plug-in foot 9 in the holder 2 or in its bore hole 10, an interlocking latching system 16 is provided that, in the embodiment shown, consists of a first latching depression 17 in the form of an axially additional notch or a circumferential groove, and a second latching depression 19, spaced at a predetermined axial distance from the first, in the form of a notch or a circumferential groove, each in the end section 11, as well as a latching element 25 on the securing element S acted on by the spring force in the engagement direction.

In the interlocking engagement of the latching element 25, a shoulder 18 of the first latching depression 17 is used for defining the target position X shown in FIG. 4. In the shown embodiment, the second latching depression 19 is provided at a short distance above the shoulder 18 and, for example, somewhat more shallowly than the first latching depression 17. In the present case, the second latching depression 19 is arranged at the side of the latching depression 17 and behind the first latching depression 17 in the insertion direction of the end section 11 during an exchange. The second latching depression 19 defines the securing position Y in accordance with FIG. 5. The distance between the second latching depression 19 and the shoulder 18 is selected in such a way that the fitting part G2 that projects only somewhat farther from the holder 2 in the securing position Y, for example, in the heating module, cannot cause any damages, i.e., cannot collide with any heating devices or other components in the heating module.

For safety reasons, additional second latching depressions 19 could be provided above the first latching depression 17 in order optionally to define even more than one securing position Y. The target position X and the securing position Y are preferably set up with the same securing element S. This is not absolutely necessary, however. The securing position Y could also be activated by a second, likewise spring-loaded securing element. The advantage thereby would be, e.g., that if a spring acting upon the first securing element 5 were to be broken or if its function were to be defective due to another reason, then the second securing element could nevertheless come to engage and ensure the securing position Y.

In the embodiment shown in FIGS. 4 and 5, the latching element 25 is a nose that projects into an, e.g., circular, recess 23 of the pin-shaped securing element S that encompasses the end section 11 at least with leeway in the drawing plane. The depth of the first latching depression 17 is selected, for example, so that, in relationship to the overlap of the latching element 25 in the recess 23, the lower edge of the recess 23 blocks the end section 11 of the plug-in foot 9 from being slid into the bore hole 10 too far, as soon as the latching element 25 has come almost into the engagement position behind the shoulder 18 shown in FIG. 4.

The securing element S has a head 24, accessible from the outside and, for example, widened, on which the external application of force 12 (FIG. 2) can be applied, and it is run in a manner that allows sliding with a shank 20 in a bore hole 21 in the holder. The bore hole 21 crosses the bore hole 10, for example, roughly perpendicularly. The securing element S is acted on in the holder 2 by a spring 22 in the direction towards the engagement position shown in FIG. 4. When the securing element is transferred into the release position, which is not shown, the spring 22 is overcome, until, for example, the back side of the latching element 25 is caught in the bore hole 21, so that the middle of the recess 23 is roughly aligned with the longitudinal axis of the end section 11 and the plug-in foot 9 can be pulled out. In the embodiment shown in FIG. 4, the radial depth of the second latching depression 19 is somewhat less than the radial depth of the first latching depression 17.

During an exchange, should the plug-in foot 9 not be inserted into the target position X shown in FIG. 4, and/or should the spring 22 not have adjusted the latching element 25 in the proper engagement behind the shoulder 18 shown in FIG. 4, the plug-in foot 9 would initially be secured frictionally, whereby an operator or exchange machine carrying out the exchange would not receive any feedback that the target position X shown in FIG. 4 had been set up.

During the operating sequence of the machine, for example, under vibrations caused by the operation and/or by the own weight of the machine element E, the end section 11 could then gradually loosen and wander downwards in the bore hole 10 and finally fall out of the bore hole 10, which could lead to damage. Thanks to the second latching depression 19, however, the latching element 25 comes to an interlocking engagement in the second latching depression 19, brought about by the spring 22 and as shown in FIG. 5, so that then the end section 11 and consequently the machine element E is fixed in place in the exactly predetermined securing position Y. The securing element S could thereby line up under the dynamic effect of the spring 22 with the surface lying below the latching element 25 on the plug-in foot 9 in the area of the transition from the shoulder 18 into the second latching depression 19.

According to FIG. 5, the monitoring device 13 is equipped with at least one detector 14 that scans the securing position Y, e.g., the bottom side of the shielding plate 7 or another prominent part of the machine element E, after the end section 11 has moved downward in the direction of an arrow 28 and the securing position Y has been set up. In the case of an exchange, the plug-in foot 9 is, otherwise, slid in the direction of an arrow 27 in FIG. 5.

Due to the relative dimensioning of the first and second latching depressions 17 and 19 and of the protrusion of the latching element 25 beyond the surface below, as indicated in FIGS. 4 and 5, the head 24 of the securing element S protrudes farther out of the holder 2 in the proper target position X in FIG. 4 than in the securing position Y in FIG. 5, so that the monitoring device 13 could also detect the securing position Y, for example, by scanning the position of the head 24 from the outside.

A reverse structure of the latching 16 is likewise possible. In this case, for example, the latching element 25 would be formed on the outer circumference of the end section 11 so that it projects, while two axially spaced latching depressions, analogous to the first and second latching depressions 17 and 19 in FIGS. 4 and 5, are formed in the securing element S in the receptacle 23. The function would be the same.

Because the machine element E, for example the fitting part G2, localized in the securing position Y no longer guarantees proper processing, for example, of the preform P in the outlet area 4, it is expedient to arrange for or initiate corrective actions after detecting the securing position Y. For example, before beginning operation or at the start of the operating sequence (the detection takes place, for example, over at least one cycle), the address of the incorrectly positioned machine element E given along the conveyor path F is conveyed to a control device CU that transports the holder 2 in question into the service area 28, where, with easy access, the proper positioning is brought about. Alternatively or additionally, using the known address of the holder 2 in question, a preform P could be inhibited from being placed onto the heating mandrel 3 or a preform P that has already been placed can be sorted out and optionally recycled before it reaches the blow-molding station B in order to avoid a reject container, or also the machine M could be brought to a standstill in order to carry out the corrective action. A switch could be used as a mechanical or electromechanical detector 14, for example, in the movement path of the shielding plate 7, whereby this switch is, e.g., activated only in the securing position Y and delivers a signal to the control unit CU as soon as the conveyor chain moves farther after an exchange. Alternatively, an opto-electronic, inductive, magnetic or other detector 14 could be provided.

A similar quick-change system, as explained on the basis of FIGS. 1 to 5, could also be used in the blow-molding station B, for example in the blow molds for molding shells or bottom molds, whereby the second securing unit P2 with the securing position Y can likewise be detected by means of a monitoring device 14. The concept of designing a quick-change system with a second securing unit P2 and an unambiguously defined securing position Y in addition to a first securing unit P1 can generally be used in machines in which machine elements are exchanged with short exchange times and quick-change systems, whereby the correct positioning of these machine elements is essential for the operational reliability.

The concept of the quick-change system with the second securing unit P2 and the securing position Y only slightly spaced from the target position X can, for example, also be used in the machine M according to FIG. 1 in an adapted form for the heating mandrel 3, for example, in the case of heating mandrel holders similar to those according to DE 10 2007 037 400 A, or in the case of other heating mandrel quick-change systems with, e.g., interlocking latching of a heating mandrel shank in the holder.

The invention claimed is:

1. A quick-change system for exchangeable machine elements that depend on the product in a machine carrying out an operating sequence, comprising a container processing machine in which a respective machine element when exchanged can be brought into a target position in a holder one of manually and by a changer in an exchange direction and can be localized in the target position by a first securing unit, the first securing unit comprising at least one securing element engaging the machine element in the target position, and at least a second securing unit with which the machine element that either one of has not been brought into the target position after an exchange or that has moved out of the target position after an exchange or during an operation sequence can be localized or positioned in a predetermined securing position that differs from the target position by a non-hazardous distance in the exchange direction.

2. The quick-change system according to claim 1, wherein the target position and the securing position each are mechanically locked positions of the machine element in the holder.

3. A quick-change system for exchangeable machine elements that depend on the product in a machine carrying out an operating sequence, comprising a container processing machine in which a respective machine element when exchanged can be brought into a target position in a holder one of manually and by a changer in an exchange direction and can be localized in the target position by a first securing unit, the first securing unit comprising at least one securing element engaging the machine element in the target position, and at least a second securing unit with which the machine element that either one of has not been brought into the target position after an exchange or that has moved out of the target position after an exchange or during an operation sequence can be localized or positioned in a predetermined securing position that differs from the target position by a non-hazardous distance in the exchange direction, wherein the respective securing element is arranged in the holder in such a manner that it is movable and can be brought into a locking position on the machine element by a spring force and can be brought from the locking position into a release position by an external application of force.

4. A quick-change system for exchangeable machine elements that depend on the product in a machine carrying out an operating sequence, comprising a container processing machine in which a respective machine element when exchanged can be brought into a target position in a holder one of manually and by a changer in an exchange direction and can be localized in the target position by a first securing unit, the first securing unit comprising at least one securing element engaging the machine element in the target position, and at least a second securing unit with which the machine element that either one of has not been brought into the target position after an exchange or that has moved out of the target position after an exchange or during an operation sequence can be localized or positioned in a predetermined securing position that differs from the target position by a non-hazardous distance in the exchange direction, and further comprising a monitoring device for detecting the securing position of the machine element in the holder and wherein the securing position detected after an exchange can be evaluated as grounds for a corrective action one of before beginning operation and in the operating sequence of the machine.

5. The quick-change system according to claim 1, wherein the machine element is one of a molding shell or bottom mold of a preform blow mold in a blow molding station, a fitting part, and a heating mandrel of a preform conveyor chain in a heating module, in each case of a blow molding machine.

6. The quick-change system according to claim 5, wherein the fitting part is localized in the target position and the securing position with at least one plug-in foot in a bore hole of the holder, wherein bore hole defines the exchange direction, the respective securing element crosses the bore hole at right angles to the exchange direction in the holder and is acted upon in the engagement direction by a spring when engaging with the plug-in foot, and the securing position is spaced from the target position at a predetermined distance in the exchange direction and is arranged on the side of the target position from which the plug-in foot can be moved to the target position during the exchange.

7. The quick-change system according to claim 6, wherein the securing element has a latching element and the plug-in foot has at least two axially spaced latching depressions that define the target position and the securing position in relationship to the securing element for engaging with each of the latching element in the engagement direction of the securing element.

8. The quick-change system according to claim 6, wherein the securing element has a latching depression and the plug-in foot has at least two axially spaced latching elements that define the target position and the securing position in relation to the securing element, each for engaging with the latching depression.

9. The quick-change system according to claim 7, wherein the first latching depression is an axially wider notch, and the second latching depression is an axially narrower notch, wherein the first and second latching depressions are in the plug-in foot, and wherein the latching element is at least one nose that projects inwardly into a recess of the securing element that encompasses the plug-in foot with leeway.

10. The quick-change system according to claim 4, wherein the monitoring device has at least one detector positioned in a stationary manner separated from the holder.

11. The quick-change system according to claim 10, wherein the at least one detector comprises one of an optoelectronic, an inductive, a magnetic and a mechanical detector.

12. The quick-change system according to claim 1, and further comprising a remote-controlled corrective drive for readjusting the machine element from the securing position into the target position.

13. The quick-change system according to claim 2, wherein the mechanically locked positions of the machine element in the holder are in the target position by means of an interlocking engagement of the machine element and the securing element and in the securing position by an interlocking engagement of the machine element and the same or an additional securing element.

14. The quick-change system according to claim 5, wherein the fitting part is a shielding plate.

15. The quick-change system according to claim 9, wherein the axially wider notch is a first circumferential groove.

16. The quick-change system according to claim 9, wherein the axially narrower notch is a second circumferential groove.

17. The quick-change system according to claim 9, wherein the axially wider notch is a first circumferential groove, the axially narrower notch is a second circumferential groove, and the second circumferential groove has a smaller depth than the first circumferential groove.

18. The quick-change system according to claim 9, and wherein the width of the second latching depression corresponds to the axial width of the first latching depression.

19. The quick-change system according to claim 10, wherein the at least one detector detects an overlap of one of the machine element or a prominent part of the machine element beyond the holder in the securing position.

20. The quick-change system according to claim 12, wherein the corrective drive is remotely controlled pneumatically.

21. The quick-change system according to claim 12, wherein the corrective drive is provided in a service area of the machine.

* * * * *